United States Patent [19]

Jensen et al.

[11] Patent Number: 4,733,821

[45] Date of Patent: Mar. 29, 1988

[54] ATOMIZER WHEEL FOR USE IN A SPRAY DRYING APPARATUS

[75] Inventors: Arnold N. Jensen, Målov; Jan Pisecky, Tåstrup, both of Denmark

[73] Assignee: A/S Niro Atomizer, Soborg, Denmark

[21] Appl. No.: 789,909

[22] Filed: Oct. 21, 1985

[30] Foreign Application Priority Data

Oct. 26, 1984 [DK] Denmark ............................ 5122/84

[51] Int. Cl.[4] .......................... B05B 3/10; B05B 3/02; B01D 1/16

[52] U.S. Cl. .................................... 239/224; 239/214; 159/4.2

[58] Field of Search ............... 239/214, 222, 223, 224, 239/700, 701, 702, 703; 159/3, 4.2

[56] References Cited

U.S. PATENT DOCUMENTS

| | | | |
|---|---|---|---|
| 1,620,625 | 3/1927 | Babka | 239/223 X |
| 2,515,665 | 7/1950 | Pieper | 239/223 |
| 4,214,708 | 7/1980 | Lacchia | 239/703 |
| 4,369,924 | 1/1983 | Morishita et al. | 239/703 |
| 4,380,321 | 4/1983 | Culbertson et al. | 239/700 |
| 4,519,549 | 5/1985 | Yokoe et al. | 239/700 X |

FOREIGN PATENT DOCUMENTS

| | | |
|---|---|---|
| 0034278 | 1/1981 | European Pat. Off. . |
| 0112101 | 6/1984 | European Pat. Off. . |
| 2336181 | 7/1977 | France . |
| 1311464 | 3/1973 | United Kingdom . |

*Primary Examiner*—Andres Kashnikow
*Assistant Examiner*—Patrick N. Burkhart
*Attorney, Agent, or Firm*—Sughrue, Mion, Zinn, Macpeak and Seas

[57] ABSTRACT

An atomizer wheel for use in a spray drying apparatus comprises an interior annular liquid supply chamber, from which a number of substantially radial ejection ducts extends towards the external surface of the wheel through a length constituting a considerable portion of the radius of the wheel. The ducts discharge into a downwardly open annular discharge slit at a comparatively short distance from an external wall connected with a wheel cover and whose inner wall surface forms an axial-symmetrical surface of revolution with a substantially linear generatrix forming an angle of not more than 15° with the axis of revolution. The comparatively steep slit wall ensures together with the large length of the ejection ducts that the liquid is atomized at the outlet of the discharge slit with a considerable downwardly directed axial velocity component so that the spray characteristics resembles those of nozzle atomization but with preservation of the general advantages with respect to flexibility and reliability of operation associated with wheel atomization.

6 Claims, 3 Drawing Figures

ATOMIZER WHEEL FOR USE IN A SPRAY DRYING APPARATUS

This invention relates to an atomizer wheel for use in a spray drying apparatus.

BACKGROUND OF THE INVENTION

For the atomization of liquid products in the form of solutions or suspensions in connection with spray drying either a rotating atomizer wheel or nozzle atomization is used.

In general, rotating atomizer wheels have a higher yield per atomizing member than nozzle atomizers and are capable of atomizing liquids having a larger solids content and viscosity. As atomizer wheels possess, moreover, far larger tolerance to changes in solids content, viscosity and liquid flow, wheel atomization is usually preferred where possible.

However, powder products produced by use of wheel atomization present certain properties that make them less appropriate for some purposes. This applies for instance to the flowing properties of the powder, i.e. the ease with which the powder flows out of or down through an aperture. This property is important in several industrial operations and moreover in connection with the use of powder in certain beverage vending machines in which a determined portion of powder shall be quickly dosed to be mixed with water.

For this reason it is preferred, in some cases, to use powder produced by nozzle atomization irrespective of the above mentioned advantages of wheel atomization.

An unambiguous explanation of the difference of properties between the two types of products is difficult to give as the flowing properties are dependent on a series of factors, such as particle size distribution, the shape of the particles and the nature of their surface, and, as far as for instance fat milk powder is concerned, the amount of fat on the surface of the particles.

SUMMARY OF THE INVENTION

The object of the invention is to provide an atomizer wheel which, while fully preserving the advantages of wheel atomization, makes it possible to obtain powder products with considerably better flowing properties than hitherto possible with prior atomizer wheels.

According to the invention an atomizer wheel is provided, comprising a drive means, a hub to be connected with said drive means, an annular supply chamber for liquid to be atomized disposed internally around the hub, a wheel cover provided with a liquid inlet opening leading to the supply chamber, and a number of substantially radial ejection ducts extending from the liquid supply chamber to an external surface of the wheel, said ejection ducts having a length constituting a considerable part of the radius of the wheel and terminating in a downwardly open, discharge slit at a relatively short distance from an external annular wall connected with the wheel cover, the inner surface of said external wall facing said discharge slit forming an axial-symmetrical surface of revolution with a substantially rectilinear generatrix including an angle of not more than 15° with the axis of rotation of the wheel, the angular spacing of the ejection ducts and the axial length of the inner surface of the external wall being chosen so as to enable the formation of a coherent liquid film on said inner surface at the orifice of the discharge slit.

The considerble length of the radial ejection ducts ensures a very strong acceleration of the liquid to be atomized. As a matter of fact, a liquid particle subjected to a tangential velocity by the ejection duct will as a result of the centrifugal acceleration caused thereby, obtain a radial velocity which as a maximum may become equal to the tangential velocity corresponding to the position of the particle. If the ejection duct is long and terminates near the circumference of the wheel, the radial velocity obtained by the particle may be of the same order of magnitude as the circumferential tangential velocity of the wheel. After leaving the ejection ducts the liquid will spread into a film on the inner side of the external wall of the annular discharge slit.

Moreover, the wheel design according to the invention possesses the advantage that after having left the ejection ducts in which a considerable velocity is imparted to it, and while it is subjected to conversion from discrete partial flow in the individual ducts into a coherent film, the liquid maintains substantially the relative speed achieved in relation to the wheel. With the said dimensioning the radial velocity in the ejection ducts is of the same order of magnitude as the circumferential velocity of the wheel. The radial velocity component will to a substantial degree be converted into an axial component during the spread of the liquid on the external wall of the annular discharge slit while the tangential component is being maintained or perhaps even increases.

Due to the described conditions of flow and velocity two advantages of the atomizer wheel according to the invention are obtained. On one hand, the liquid remains in a continuous film on the external wall of the annular discharge slit under the influence of a strong centrifugal field for such a long time that possible air bubbles have enough time to be expelled. On the other hand, as a result of the atomization the liquid will leave the edge of the atomizer wheel as a conical surface with velocity components of the same order of magnitude in the tangential and in the axial direction. The latter property is advantageous in two ways. On one hand, the atomization mechanism resembles the one known from nozzles, and the particular properties characteristic of power prepared by nozzle atomization—most particularly the good flowing properties—have incidentally also been observed in powder prepared by tests using an atomizer wheel according to the invention. On the other hand, the form of the spray cloud produced by the atomizer wheel is almost like an acute cone in contradiction to the flat umbrella ordinarily observed with known atomizer wheels. This fact opens possibilities of using spray drying chambers with a smaller diameter.

Incidentally, it is known to design the external wall of an atomizer wheel as an inwardly facing frusto-conical surface on which a coherent liquid film is settling prior to the atomization at the downwardly facing edge of the surface. Such wheel designs are known, for instance from published European Patent Application No. 0,112,101 and from Danish Patent Specification No. 86,740. The object of these prior wheels is to avoid undesired deposits of solids. According to said published European patent application this is achieved, for instance by reducing the residence time of the liquid film on said surface, thereby restricting the thickness of the liquid film, and it is prescribed that the frusto-conical surface should preferably have an apical angle in the range from 80° to 120°.

BRIEF DESCRIPTION OF THE DRAWINGS

In the following, the invention will be explained in detail with reference to the drawings, in which.

DETAILED DESCRIPTION

Figure 1:
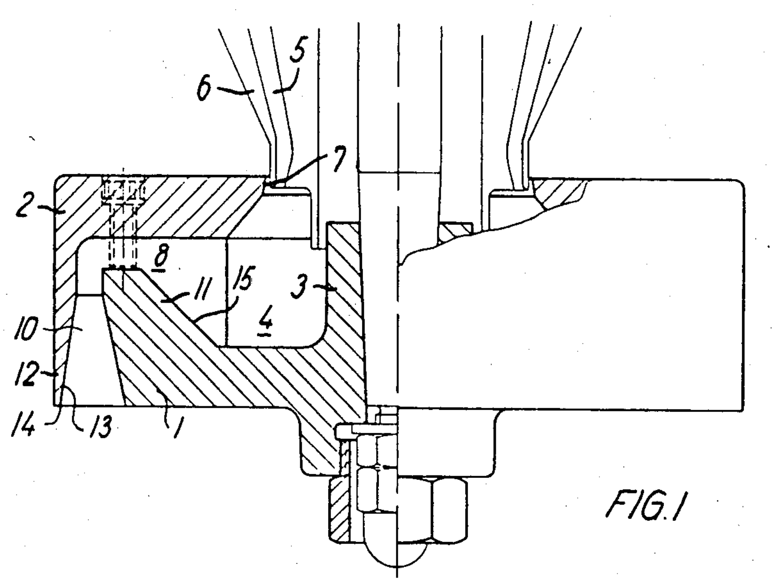
FIG. 1 is a partial axial sectional view of an embodiment of an atomizer wheel according to the invention.

The embodiment of an atomizer wheel according to the invention illustrated in FIG. 1 includes a lower part 1 and an upper part 2 forming a wheel cover. The lower part 1 is designed with a hub 3 to be connected with a drive means not shown and comprises around the hub 3 an internal annular supply chamber 4 for the liquid to be atomized, said liquid being supplied through an annular slit 5 in a liquid distributor 6 extending into a central opening 7 in the cover.

Figure 3:
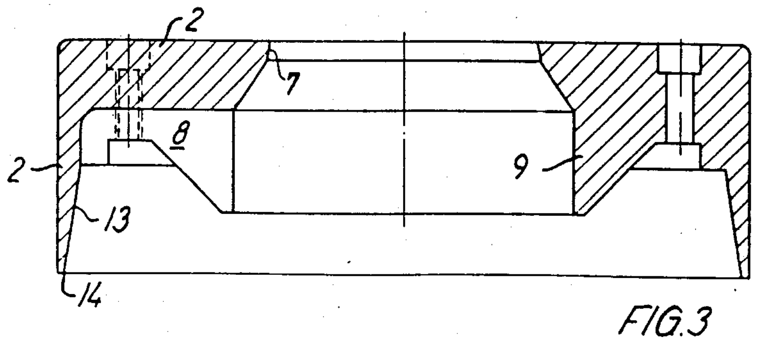

From the annular liquid supply chamber 4 a number of ejection ducts extend towards the circumference of the wheel. In the illustrated embodiment the ducts 8 are formed in the underside of the wheel cover 2 and are separated as shown in FIG. 3 by downwardly extending intermediate pieces 9.

Figure 2:
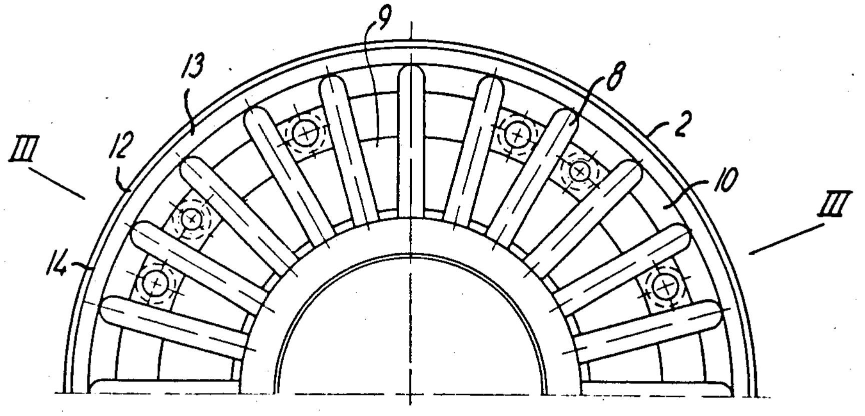
FIGS. 2 and 3 show a wheel cover in the embodiment illustrated in FIG. 1, viewed from the interior of the atomizer wheel and in a sectional view along the lines III—III in FIG. 2, respectively.

As most clearly apparent from FIG. 2 the ejection ducts 8 have, in accordance with the invention, a length constituting a considerable portion of the total radius of the wheel, the length of the ejection ducts 8 being preferably larger than the radial extension of the liquid supply chamber 4. The ducts 8 terminate into a downwardly open annular discharge slit 10 whose internal surface is formed by the external surface of a protuberant edge portion 11 on the lower part 1 of the wheel around the annular chamber 4 while the external surface of the slit 10 is constituted by the inner side of a circumferential external wall extending downwardly from the wheel cover 2.

Due to the considerable length of the ejection ducts 8 a strong acceleration of the flowing liquid will take place in each duct so that the liquid leaves the duct 8 with a radial velocity component of the same order of magnitude as the tangential component, caused by the centrifugal force, at the duct outlet in the discharge slit 10.

The inner surface 13 of the external wall 12 constitutes an axial-symmetrical surface of revolution with a substantially linear generatrix including, according to the invention, an angle of not more than 15° with the axis of revolution. In the illustrated embodiment said angle is about 9°. On the inner surface 13 thus extending steeply downwards from the outlets of the ejection ducts 8 at the upwardly closed upper end of the discharge slit 10, a coherent film is formed from the liquid ejected from the ducts 8 during the rotation of the wheel, and the atomization of the film is effected by tearing off from the lower edge of the external wall 12. The number of ejection ducts 8 of which twenty-four are present in the illustrated embodiment and the axial extension of the inner surface 13 of the external wall 12 are dimensioned just with a view to formation of such a coherent liquid film. The steepness of the surface of revolution, in the illustrated embodiment a frusto-conical surface, created by the wall inner surface 13 causes the considerable radial velocity component of the ejected liquid at the outlets of the ducts to be converted into a substantially equally large downwardly directed velocity component so that the total atomization from the tear-off edge 14 is effected in the form of a cone having an acute apical angle, in contrast with the comparatively flat umbrella-shaped spray cloud issuing from atomizer wheels having ejection apertures in the outside of the wheel. Thereby, the atomization from the wheel resembles to a substantial degree nozzle atomization while preserving the general advantages with respect to flexibility and reliability in operation associated with wheel atomization.

To make the flow of liquid as favourable as possible at the transition from the ejection ducts 8 to the discharge slit 10, said discharge slit 10 is curved at the upper side of the outlets of the ejection ducts 8.

In the illustrated embodiment the inner side 15 facing the annular liquid supply chamber 4, of the protuberant edge portion 11 of the lower part 1 forms an outwardly upwards sloping bottom for all the ejection ducts 8. Thereby, the liquid ejection through the ducts 8 has imparted to it a gradually increasing acceleration in the direction from the chamber 4 until it is strongly accelerated in the successive tubular portion of the ducts 8.

In addition, the axial extension of the inner wall surface 13 of the external wall 12 is dimensioned so that the liquid film formed on the wall inner surface remains so long thereon that air bubbles are expelled. This provides an advantageous reduction of the amount of occluded air in the powder product produced by the spray drying.

In the illustrated embodiment the external side of the protuberant edge portion 11 of the external surface of the lower part 1 has such a shape that the width of the discharge slit 10 increases in the direction towards the downwardly directed outlet of the slit. This eliminates substantially the risk of undesired deposits of dried solids at the outlet of the slit.

The invention is not limited to the illustrated embodiment since the ejection ducts as well as the discharge slit may have other shapes, provided the length of the ejection ducts constitutes a considerable portion of the radius of the wheel and the form of the external wall of the discharge slit is such that a coherent liquid film remaining for a comparatively long time in the centrifugal field is formed on the wall. The inner wall surface 13 may have another form than shown, for instance a cylindrical surface or a downwardly diverging frustoconical surface or a slightly curved surface, provided it has such a steepness that the above mentioned considerable axial velocity component is ensured at the atomization.

EXAMPLE 1

An industrial spray drying plant was used consisting of a spray dryer with an associated vibrated fluid bed as an afterdryer.

Drying tests with skimmed milk concentrate were effected. Tests were carried out, firstly with a conventional atomizer wheel with a diameter of 210 mm and straight ejection ducts, second with an atomizer wheel as illustrated in the drawing and with the same diameter, and the tests were further carried out under the same drying conditions.

The flowability of the produced powder products was measured according to "Analytical Methods for Dry Milk Products", Fourth Edition, issued by A/S Niro Atomizer, Copenhagen (1978) Method No. A23a, according to which the flowability of a powder is determined in a standard apparatus as the time (in seconds) necessary for a given volume of the powder to leave a rotating drum through given slits.

The flowability of the powder produced by using a conventional atomizer wheel was forty-one seconds, for the powder produced by the atomizer wheel according to the invention twenty-two seconds.

EXAMPLE 2

Drying tests with a fat milk concentrate containing 40% foreign fat were carried out, but otherwise in the same drying plant and under the same conditions as in Example 1.

The flowability was measured to forty-one seconds in tests with a conventional wheel and twenty-two seconds in tests with the wheel according to the invention, respectively.

EXAMPLE 3

In another spray drying plant of the same type as used in Example 1 and 2 drying tests with a fat milk concentrate containing 50% foreign fat were carried out. In this case the flowability was measured to eighty-two seconds for the powder produced in the tests with a conventional atomizer wheel and sixteen seconds for the powder produced in the tests with the wheel according to the invention.

We claim:

1. An atomizer wheel for a spray drying apparatus, comprising:

(a) an inner, cup-shaped wheel member (1) defining a central hub (3) for connection to rotary drive means, and (b) an outer, cup-shaped wheel cover (2) of larger diameter than the wheel member, inverted with respect thereto, and overlying the wheel member to successively define therewith in a radially outward direction;

(1) an annular liquid supply chamber (4) surrounding the hub and having an inlet opening (7), (2) a plurality of discrete, radially oriented, circumferentially spaced, elongate ejection ducts (8)

having lengths extending over a substantial portion of the radius of the wheel and in open communication with the supply chamber through inlet portions having decreasing cross-sectional areas in a radially outward direction away from the supply chamber, and (3) a continuous annular concentric discharge slot (10) substantially perpendicular to the ejection ducts and having an upper end merging smoothly with outer ends of the ducts and a lower, outlet end having an outer wall (12) outwardly inclined to the wheel axis at an angle no greater than 15°, (c) the lengths of the ejection ducts imparting a radial velocity to liquid being atomized, due to centrifugal force, of the same order of magnitude as a tangential velocity imparted to the liquid by the rotation of the wheel, and such radial velocity thereafter being transformed into an axial velocity component during the spreading of the liquid into a coherent film on the outer wall of the discharge slot.

2. An atomizer wheel as claimed in claim 1, wherein the inlet portion of each ejection duct is provided adjacent the liquid supply chamber and has an outwardly, upwardly inclined bottom (15) merging with a bottom of the liquid supply chamber.

3. An atomizer wheel as claimed in claim 1, wherein the length of the ejection ducts is greater than the radial width of the liquid supply chamber annulus.

4. An atomizer wheel as claimed in claim 1, wherein the transition between the discharge slot and an upper side of outlets of the ejection ducts is curved.

5. An atomizer wheel as claimed in claim 1, wherein the width of the discharge slot increases in a direction towards a downwardly facing outlet thereof.

6. An atomizer wheel as claimed in claim 1, wherein the wheel member (1) forms a bottom of the liquid supply chamber, bottoms of the ejection ducts, and an inner surface of the discharge slot, and the wheel cover (2) forms said outer wall, the ejection ducts being formed in an underside of said wheel cover.

* * * * *